INVENTOR
F. K. BOWERS
BY H. O. Wright
ATTORNEY

Oct. 25, 1960 F. K. BOWERS 2,957,947

PULSE CODE TRANSMISSION SYSTEM

Filed Feb. 20, 1957 2 Sheets-Sheet 2

INVENTOR
F. K. BOWERS
BY H. O. Wright
ATTORNEY

United States Patent Office 2,957,947
Patented Oct. 25, 1960

2,957,947

PULSE CODE TRANSMISSION SYSTEM

Fritz K. Bowers, Convent Station, N.J., assignor to Bell Telephone Laboratories, Incorporated, New York, N.Y., a corporation of New York Filed Feb. 20, 1957, Ser. No. 641,345

17 Claims. (Cl. 179—15.6)

This invention relates to systems for the transmission of information by pulse code techniques and more particularly to a system for encoding such information.

A principal object of the invention is to simplify and reduce the cost of pulse transmission systems.

A related object is to eliminate or reduce the tendency of the reference potential level of a transmitted pulse train to wander or drift and thus to increase the reliability of signal transmission.

Another related object is to reduce the low frequency bandwidth required of a pulse transmission system.

Other objects, features and advantages of the invention will appear from the description which follows.

It is well known that one of the outstanding advantages of transmission by pulse code is that the pulse train may be regenerated in a repeater station before the pulses have been degraded by noise or apparatus defects to a point such that they cannot be reliably decoded. After such regeneration the pulses are clean and sharp in outline. This regeneration can be carried out successfully at each of a number of repeater points between a transmitter station and a receiver station.

To carry out such regeneration of a conventional binary code pulse train of On pulses and Off pulses, i.e. spaces, it is desirable that the current or voltage amplitudes which represent pulses and spaces remain at fixed values. Where transmission is by carrier, this presents no serious problem. When the code pulse train is transmitted without modulation, however, it ordinarily becomes necessary that all low frequency components be accurately preserved. Otherwise, by way of typical example, when a protracted sequence of On pulses occurs the reference potential level of the transmitted signal drifts downward. Contrariwise, when a protracted sequence of Off pulses, i.e. spaces, occurs, this reference potential level drifts in the opposite direction, upwards. Such drift of the signal reference potential level endangers the accuracy of recognition of pulses and spaces, particularly in the presence of noise or other interference.

To reduce the rate of potential level drift to such a point that transmission is reasonably secure, time constants of the transmission system elements must be very long. If transformers, for example, are employed, they must have such broad frequency pass bands as to make them excessively bulky and very costly. Other apparatus of the character known as "D.-C. restorers" may be introduced to prevent the drift of the signal reference potential level, but only at a substantial sacrifice in the simplicity of the apparatus. Normally, too, the successful operation of a D.-C. restorer in a transmission system requires a substantial increase in the high frequency transmission capability of the system.

This problem of potential drift elimination is of heightened significance in its applicability to a long distance transmission system which may employ many repeaters and coupling elements. In such a system the increased cost and complexity of single elements are multiplied many fold in the overall system.

In accordance with the invention in one of its aspects this drift of the potential reference level of the transmitted pulse train is eliminated by the generation of a specially derived pulse train which has substantially no low frequency components. This new pulse train is generated by dividing the pulse train into pulse groups, delaying each one of the successive groups of the original pulse train for a time interval equal to that occupied by the pulse group, comparing the group average potential level with any incipient drift in the potential level of the transmission system and, thereafter, transmitting the delayed pulse group with a polarity to compensate for, and thus prevent, the incipient potential level drift.

In so selecting the polarity with which successive pulse groups are transmitted, that is, in the selected inversion of certain groups of the entire pulse train, the invention yields another important advantage. The selected inversion of the various pulse groups, viewed from one standpoint, constitutes an establishment of a constant duty cycle of currents flowing in a transmission channel. That is, a fixed relation is established between the respective numbers of occurrences of On and Off pulse signals. Modern transmission systems more and more employ transistorized repeaters and amplifiers. If is well known that small bias potentials are required with the transistor elements of such circuits and that correspondingly small variations in these bias potentials may result in serious derangements of the circuit operation. Hence, the power supplies which provide these potentials and which are sources of the currents which constitute the amplified output signals of these repeaters and amplifiers, must be designed for a high order of voltage regulation.

The designer's task is simplified in great degree if the power supply is called upon to supply output signal currents at a constant rate. Practice of the invention achieves a close approximation to such constant rate current drain upon the various power supplies employed in a transmission system. Thus, practice of the invention does not only achieve simplification and economy by eliminating the need for costly compensating devices to accommodate wandering potential reference levels. It achieves simplification and economy also in the design of the basic amplifying elements common to all transmission systems.

The selective inversion of the polarity of signal pulse groups presents an ambiguity to the receiving station at the far end of a transmission channel. In order to resolve this ambiguity the invention provides means for identifying the polarity with which the individual pulse group has been transmitted. Thus, by way of example, a group of three On pulses followed by one space is converted, in accordance with the invention, into a new group of one space, three On pulses and one space. This new group, if transmitted with normal polarity, arrives at a receiving station where appropriate apparatus recognizes from the space appearing in the first pulse position that the signal has been transmitted with normal polarity.

Contrariwise, if it appears that signals previously transmitted indicate an incipient sag in the potential reference level in the transmission line, the invention insures that the delayed new group is inverted since its three On pulses tend to increase the incipient sag. Thus the On pulses become spaces and the spaces become On pulses. This inversion is signalled to the receiving apparatus by the arrival of an On pulse, instead of a space, in the first, or indicating pulse position.

The invention will be more fully apprehended from the following detailed description of illustrative embodiments of the invention taken in connection with the appended claims and the drawings in which:

Figure 1:
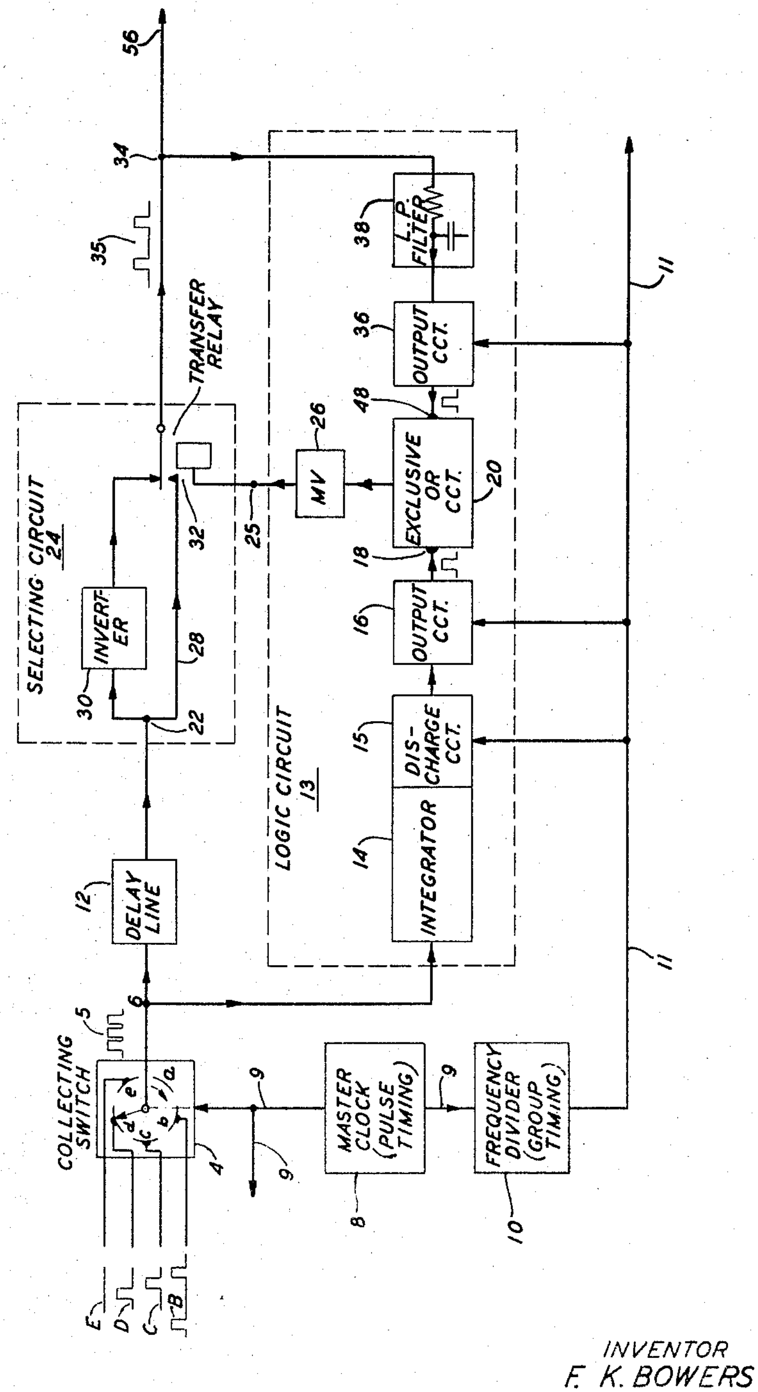
Fig. 1 is a partial schematic block diagram showing a message encoder in accordance with the invention.

Referring now more particularly to the drawings, Fig. 1 shows a time division pulse message encoder which employs important features of the invention. Repetitively, and in sequence, a powered, rotary collecting switch 4 samples fixed-amplitude On-Off pulse signals B, C, D and E, from sources not shown, at the switch contacts *b*, *c*, *d*, and *e*. At the beginning of its rotational period the switch occupies a null contact position *a*. Hence, from the collecting switch, a group of pulse signals is delivered to the distribution point 6, each such pulse group being identified by a null voltage, i.e. a space signal, in its first pulse position. A master clock 8 which may be, for example, a multivibrator such as that shown by J. Millman and H. Taub in "Pulse and Digital Circuits," McGraw-Hill Book Co., Inc., 1956, at page 199, provides a synchronizing signal to the collecting switch through a conductor 9 to insure its steady rotation, each multivibrator oscillation corresponding to a different switch contact position.

A frequency divider 10, for example, one such as shown by Millman and Taub at page 364, derives from the multivibrator a group timing pulse signal having a period T equal to the time interval occupied by each group of five pulse positions. From the distribution point 6, each successive pulse group passes through a delay line 12 and is delayed in time by an amount equal to the pulse group period T.

From the distribution point 6 the pulse group is also applied to a first input unit of a composite logic circuit 13, the integrator 14. Here, in well-known fashion, a signal is derived equal to the average amplitude of all signals in the group. This integrator has associated with it well-known circuitry 15 activated by the group timing frequency divider signal applied through conductor 11, for automatic discharge of the integrator signal at the end of each pulse signal group. This circuitry may, for example, include a gas filled triode connected in shunt with the integrator output. From the integrator the output signal there derived is supplied to a triggered output circuit 16 consisting of a cathode-coupled binary circuit, such as that shown by Millman and Taub, cited above, at page 169 which is connected in series with an AND circuit such as shown by Millman and Taub at page 400. This output circuit functions to generate an output pulse when actuated by a trigger signal, e.g. the group timing signal derived from the frequency divider 10 and applied through the path shown, if, but only if, the integrator output signal rises above a preassigned level.

Through adjusters as indicated by Millman and Taub at page 169 this level is established at a value something less than one-half the amplitude of the pulse signal variation between an Off pulse and an On pulse. More exactly, this level is established at one-half the full pulse amplitude multiplied by that fraction of a code interval allotted to an individual pulse which is actually occupied by a pulse. This small deviation arises from the fact that a practical pulse code group of all On pulses is not normally a continuous signal at a given level but rather a succession of distinct On pulses separated by short spaces, for example, spaces having a duration one-tenth that of a pulse.

The output signal of the circuit 16 is delivered to a first input point 18 of an exclusive OR circuit 20, that is, a triggered pulse generating circuit responsive to either one of two possible input signals but not to both. This OR circuit may be any one of several such circuits well known in the data processing art, for example, one discussed by Millman and Taub at page 411.

The same pulse group which initiates the above-described circuit actions, in passing through the delay line 12 from the distribution point 6, arrives at the input point 22 of a polarity selecting circuit 24 just after its integrated value has activated the output circuit 16. In the selecting circuit 24 the delayed pulse group signal is translated through one or the other of two alternative paths, 28 and 30, to a transfer relay 32, and thence to an output point 34. Which path is traversed by the delayed signal is dependent upon a control signal applied to a selecting circuit control point 25 and thence to the control winding of the relay 32 by a monostable multivibrator 26 which has a pulse length equal to one signal pulse group period. The first of these alternative paths is a simple conducting path 28 interconnecting the selecting circuit input point 22 with a first contact of a single-pole, double-throw, signal-operated, transfer relay 32. The second path comprises a single inverting amplifier stage likewise connected between the input point 22 and the opposite contact of the double-throw transfer relay 32. In its rest condition this transfer relay is designed, as shown, to accept signals arriving through the inverting path 30. From the selecting circuit output point 34 the signal is applied both to a transmission line indicated by the arrow 56 and to a second input unit of the composite logic circuit 13, that is, to an integrator in the form of a low pass filter 38.

It is the inability of most practical transmission lines to transmit low frequency components of signals applied thereto which gives rise to the potential drift which the present invention eliminates. The low pass filter 38 is designed, in accordance with well-known techniques, to have a frequency response characteristic which is complementary to that of the transmission line represented by the arrow 56. Hence, the low pass filter derives a filtered output signal proportional to the signal components applied to, but not transmitted through, the transmission channel. This filtered signal is applied to a second output circuit 36 of the type previously described in connection with circuit 16. In the output circuit 36, the proportional filtered signal is compared in amplitude with a preassigned potential reference level. This preassigned level is related to the level associated with the output circuit 16 by the same proportionality constant that relates the filtered signal to the output signal appearing at point 34. Preferably it is established at a value one-half that corresponding to a continuous train of On pulses. If it exceeds this level, the filtered signal places the output circuit 36 in readiness to generate a pulse signal when triggered. This triggering is accomplished by the application of a group timing pulse signal to the output circuit by the frequency divider 10.

Thus, under proper conditions, the two output circuits 16 and 36 are triggered simultaneously to derive indicating output pulse signals. That is to say, the circuits 16 and 36 each derive an output pulse signal if the output signal of the integrator 14 and the filtered signal output of filter 38 each exceed the preassigned potential reference level selected for the associated output circuit. These output pulse signals, in turn, are, respectively, applied, from the output circuits 16 and 36, to the first input point 18 and the second input point 48 of the exclusive OR circuit 20.

In the event a pulse is applied to only one of the two input points 18 and 48, the exclusive OR circuit delivers a pulse to trigger a monostable multivibrator 26, for example, a multivibrator such as shown by Millman and Taub at page 175, which has a pulse duration equal to one signal pulse group interval. This multivibrator signal is applied to the selecting circuit control point 25 to drive the transfer relay into a position to conduct signals with normal polarity from the selecting circuit input point 22 to the output point 34.

In an alternative case, both signals to the exclusive OR circuit may be alike. In this situation the circuit of Fig. 1 operates upon incoming signals as set forth in the following example: A group of pulses having three On pulses and two spaces, illustrated by the curve 5, is derived from the collecting switch 4. This group has a net On component, i.e. a positive low frequency component. For purposes of the example this group is preceded by other signal groups having a similar positive low frequency component. The three On pulses of the group are added in the integrator 14 to provide to the output circuit 16 a positive input signal, i.e. a signal positive with respect to the earlier mentioned preassigned level. Concurrently, through the low pass filter 38, a similar positive input signal is applied to the output circuit 36.

As generation of an entire pulse group is completed by the collecting switch 4, the frequency divider 10 sends a group timing pulse through conductor 11 to trigger the two output circuits 16 and 36 and to discharge the signal built up in the integrator 14. The output circuits 16 and 36 each apply positive pulses to the OR circuit input points 18 and 48 respectively. Hence, no signal is derived from the OR circuit to trigger the multivibrator 26 and the transfer relay 32 remains in its rest condition. Thus, the signal pulse group, having passed through the delay line 12, passes through the inverting path 30 and is propagated along the transmission channel 56 with inverted polarity as a code group of three spaces and two On pulses illustrated by the curve 35.

In this fashion, a pulse group is propagated over the transmission channel with a polarity selected by the structure of the invention to oppose the incipient drift in transmission channel potential level. Thus, this drift is counteracted and the channel potential level is held substantially constant.

Figure 2:
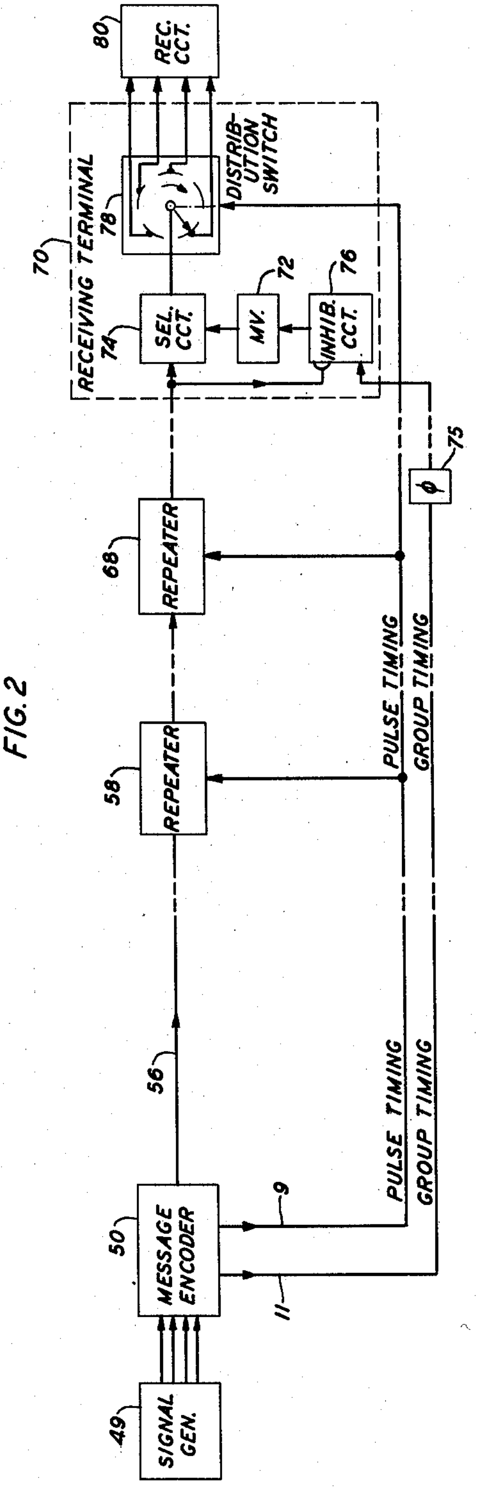
Fig. 2 is a partial schematic diagram showing a complete transmission system employing the principles of the invention.

In Fig. 2 a complete transmission system in accordance with the invention is illustrated. Here a signal generator 49 which, for example, can take a form similar to the microphone, telephone terminal equipment and the coding circuit diagrammed in Fig. 1 of W. M. Goodall Patent No. 2,720,557, granted October 11, 1955, is shown. The generator supplies binary signals on four channels similar to the five coding circuit output channels of the Goodall Fig. 1, to a message encoder 50 which is identical to the encoder detailed in Fig. 1 wherein pulse and groups timing signals of the multivibrator 8 and frequency divider 10 appear on the conductors 9 and 11 also shown in Fig. 1. In the message encoder the signals arriving on four different channels are converted to time sequential groups of five pulses of selected polarity as discussed in more detail in connection with Fig. 1. From the message encoder each of the successive groups of pulses, occupying five significant pulse code intervals, are transmitted with selected polarity over a transmission line 56 to the first repeater 58 of a plurality of tandem connected repeaters and thence to a terminal 70.

The pulse timing signal and group timing signal which are respectively applied to the conductors 9 and 11, as detailed in Fig. 1, are shown, for illustrative purposes and to simplify the drawings and description, as being supplied through these same conductors extended to various repeaters and receivers distributed along the transmission system. While this is an operative arrangement, practical considerations usually indicate that it may be economically preferable, as an alternative, equivalent arrangement, to provide at each station of the system a timing pulse or a source circuit which is constructed to derive synchronizing information from the incoming signal itself so as to provide suitable timing pulses for controlling purposes as described. Such a circuit, for example, might employ a multivibrator synchronized as discussed by S. Seely in "Electron-Tube Circuits," McGraw Hill Book Co., Inc. (1950), at page 408.

The repeater 58, at which the signal propagated on the transmission line 56 arrives, may be any one of many such repeaters well known in the art. For example, it may be a repeater similar to that shown in L. R. Wrathall Patent No. 2,703,368, granted March 1, 1955, except that selected inversion of the particular individual pulse groups in accordance with the invention eliminates potential level drift from the arrival signal. It is immediately apparent that the repeater of Wrathall may be considerably simplified by the elimination of its drift compensating circuits. Thus, referring to the Wrathall Fig. 2, no need in the present system exists for the feedback path 28 insofar as its zero-wander correcting function is concerned.

From the repeater 58 the pulse train derived in accordance with the invention is transmitted along the transmission channel, being periodically regenerated in amplitude at suitable distance intervals by a succession of similar tandem connected repeaters, not shown, to the final repeater 68. All of these repeaters regenerate, amplify, and retransmit the signal derived in accordance with the invention. Since the tendency of this signal to drift in potential level has been eliminated by the practice of the invention, each of these repeaters may be simplified to be substantially identical to the first repeater 58 as described above.

From the final repeater 68 the signal is transmitted to a receiving terminal 70. Practice of the invention eliminates from the signal arriving at this terminal its direct informational significance in that substantially all low frequency components of the orginal signal have been eliminated by the selective inversion processes in accordance with the invention. This information lies latent, however, in the arrival signal in the polarity indicating signal in the first code pulse position of each arriving signal group. The receiving terminal extracts this latent information from each signal group and restores each group's direct informational significance with the restoration of low frequency components existing in the original signal. The receiving terminal accomplishes this restoration, in a manner of speaking, by undoing the work of the message encoder, that is, by selectively reinverting particular ones of the arrival signal groups.

The receiving terminal comprises a selecting circuit 74, discussed in connection with Fig. 1, actuated by a monostable multivibrator 72 which has a period equal to that of a signal pulse group and which is triggered by a signal from an Inhibitor circuit 76 such as that shown by Millman and Taub at page 402, Fig. 13–14(*b*). The signal group, arriving at the receiving terminal, is applied to the selecting circuit and to the inhibiting terminal of the coincidence Inhibitor circuit. A group timing pulse, phased by a well-known circuit 75, for example, a variable resistance capacitance network, to coincide with the indicating pulse position of each group is also applied to an input terminal of this Inhibitor circuit. Assuming the first, or indicating, code position of the arriving pulse group to be occupied by a pulse, it is required that this entire group be inverted. Hence, with the group timing pulse arriving coincident with the indicating code position pulse, the Inhibitor circuit generates no output signal to trigger the multivibrator 72, and, accordingly, the selecting circuit 74, as discussed in connection with the selecting circuit 24 of Fig. 1, remains in its rest condition. Hence, from this circuit the arrival signal group is applied to a distribution switch 78 with reinverted polarity, i.e. with the polarity originally derived by the collecting switch of the encoder 50. This distribution switch 78 is a five contact powered rotary switch similar to the collecting switch of Fig. 1, synchronized in its operation by the pulses from the conductor 9 to separate arrival pulse groups into four separate signals. These signals are applied to conventional receiver circuits 80, which may take a form similar to the decoding equipment and telephone receiver shown in Fig. 1 of the aforementioned patent to W. M. Goodall.

Figure 3:
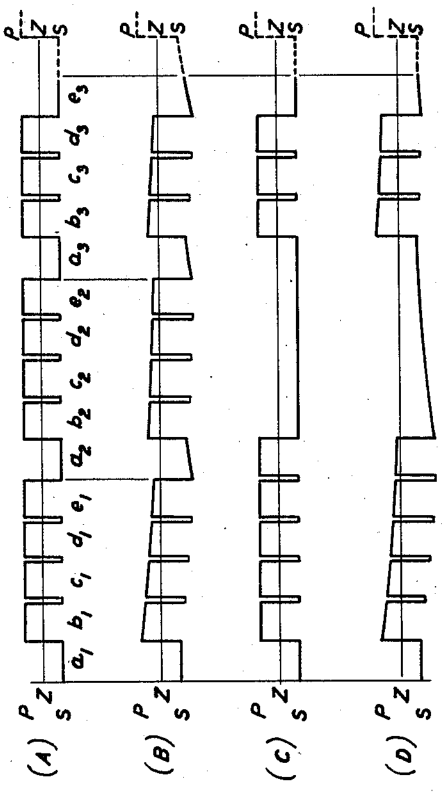
Fig. 3 is a diagram of somewhat idealized waveforms of assistance in describing the operation of the apparatus of Figs. 1 and 2.

A more detailed understanding of the operation of the invention may be had with reference to the waveforms of Fig. 3. Fig. 3A illustrates a typical signal of three pulse groups, each extending through five code pulse positions, which might be applied to the input point 6 of Fig. 1. The initial code pulse position $a_1$, $a_2$, $a_3$ of each of these three groups is indicated by a null voltage or space signal, whereas the majority of the remaining code pulse positions are occupied by positive or On pulses. The line ZZ indicates an arbitrary zero potential level about which an ideally transmitted signal would vary from its space value S to its On pulse value P.

In Fig. 3(B) there is shown the waveform of this signal as it might appear after transmission over a system which transmits poorly the low frequency components of the signal. The peak amplitudes of the waves tend to drift toward the zero reference level ZZ because of this poor low frequency system response. As is apparent from the drawing, waves of the form shown in Fig. 3(B) might become completely unrecognizable to a receiving system designed, as is customary, for half amplitude signal recognition.

Fig. 3(C) shows a waveform of a signal which results from the selective inversion of the Fig. 3(A) signal, in accordance with the invention. Here the first and third signal groups, the groups comprising pulse intervals $a_1$, to $e_1$ and $a_3$ to $e_3$, as shown, have normal polarity. The indicating code pulse positions of these two groups, the positions $a_1$ and $a_3$, as shown, are occupied by a space signal. The second signal group is inverted in polarity for transmission, that is, all On pulses have become space signals and vice versa. This fact is indicated by the On pulse appearing in this group's initial code pulse position $a_2$.

Fig. 3(D) illustrates the signal of Fig. 3(C) as it appears upon reception at the receiving end of a transmission system. The figure shows a substantial separation of the second and third groups' signal level from the arbitrary zero reference level ZZ. This demonstrates graphically the improvement in signal clarity brought about by practice of the invention.

The invention's contribution to system simplicity and economy is evident, as above discussed. While the invention has been discussed in terms of a specific illustrative embodiment, it will be clear to one skilled in the art that the spirit and practice of the invention is not restricted to this structure. For example, as discussed previously in outline, the extended signal conductors shown for conveying synchronizing information from a transmitting station to all other stations in the system may be eliminated and replaced with local synchronizing sources at the individual stations. Similarly, too, the invention may achieve useful results without its being practiced in connection with a transmission system having poor low frequency transmission characteristics. Even further, it is apparent that the four pulse, time sharing signal group source with which the illustrated embodiment of the invention is joined in cooperative relationship may be replaced by a multiple pulse signal group source or by a time sequential pulse group source with like transmission system improvement. These modifications in the practice of the invention and many others will be apparent to those skilled in the art.

What is claimed is:

1. In a system for the transmission to a receiver station, by way of a channel that is opaque to direct current components, of information-bearing groups of unipolarity pulses, the direct current components of said groups being variable from group to group, the opacity of said channel to said direct current components thus giving rise to a wander of a reference potential on said channel, apparatus for reducing the wander of said reference potential which comprises means, responsive to substantial identity of magnitude of the direct current component of each group with that of its predecessor for selectively inverting the polarities of all the pulses of said predecessor group, and means at said receiver station responsive to inversion of all the pulses of any group, for reinverting all of said inverted pulses.

2. In a system for the transmission, by way of a channel that is opaque to direct current components, of information-bearing groups of unipolarity pulses, the direct current component of each group being dependent on the number of On-pulses of the group, the opacity of said channel to said direct current components thus giving rise to a wander of a reference potential on said channel, apparatus for reducing said wander which comprises means for sensing the magnitude of the direct current component of a selected pulse group, means for deriving an auxiliary signal that is proportional to the number of On-pulses in an adjacent selected group, means for comparing said sensed magnitude with said auxiliary signal to derive a control signal of one kind when said compared entities are unlike and of another kind when they are alike, and means responsive to one of said control signals for selectively inverting the polarities of all the pulses of one of said selected groups, thereby to offset the direct current component of the other selected group.

3. In combination with apparatus as defined in claim 1, means, operative prior to said comparison, for delaying one of said selected pulse groups by a single pulse group interval, and means for simultaneously comparing the sensed magnitude with the auxiliary signal.

4. In apparatus as defined in claim 3, means for sensing the magnitude of the direct current component of the delayed pulse group, and means for deriving an auxiliary signal that is proportional to the number of On-pulses in the undelayed pulse group.

5. Apparatus as defined in claim 2, wherein said auxiliary signal deriving means in arranged to derive said auxiliary signal from the pulse group immediately following the pulse group of which the direct current component is sensed.

6. Apparatus as defined in claim 2, wherein the polarity-inverting means is arranged to invert the polarities of the pulses of the earlier one of said two selected groups.

7. Apparatus as set forth in claim 1 wherein said selective inverting means comprises signal-operated switch means having an input point, an output point and a control point for translating individual groups of said pulses between said input point and said output point with a polarity selected by a signal applied to said control point, comparison means having dual input points for applying a control signal to said control point in dependence upon the relative amplitudes of dual input signals applied to said dual input points, low pass filter means having a signal frequency response complementary to the response of said transmission channel, for applying a first input signal to said comparison means, said filter means being interconnected between said output point and one of said dual input points, and integrating means interconnected between said source and the other of said dual input points for applying a second input signal to said comparison means in proportion to the potential level of each of said groups of pulses whereby said comparison means derives a control signal responsive to signals applied to said input point and to said output point.

8. Apparatus as set forth in claim 7, and in combination therewith, delay means interposed between said input point and the source of said information-bearing unipolarity pulse groups for delaying the application of said individual groups of pulses to said input point by a fixed interval, and synchronizing means for actuating said comparison means in time coincidence with the application of said individual groups to said input point.

9. Apparatus as set forth in claim 8 wherein said integrating means comprises means for discharging said group potential level signal in response to said synchronizing means.

10. In a system for communication between a source of a signal train of binary pulses and a receiving station interconnected therewith by a transmission channel having a signal frequency response characterized in a rejection of low frequency signal components, whereby a wandering reference potential level is imposed upon trains of pulses having low frequency components when transmitted through said transmission channel, the combination which comprises means for periodically inserting a designating pulse signal of fixed polarity into said train of pulses, thereby to form a distinctive sequence of coded pulse groups each extending throughout a fixed interval, said inserting means being interposed between said source and said channel, signal responsive means for selectively inverting the polarity of individual ones of said pulse groups, means for deriving a control signal indicative of the comparison of the potential level of each successive individual pulse group with the potential level of signal components rejected by said transmission channel prior to the occurrence of said pulse group, means for applying said control signal in operating relation to said signal responsive inverting means, thereby to form a new train of coded pulse groups, each group having associated therewith a designating pulse signal of alternative polarity, wherein low frequency components are substantially eliminated and means for applying said new train of pulse groups to said transmission channel, whereby said new train is propagated along said channel toward said receiving station free from the imposition of a wandering reference potential level.

11. Apparatus as set forth in claim 10 wherein said receiving station comprises means for selectively reinverting the polarity of individual ones of coded pulse groups of said new train in response to the polarity of the designating pulse signal associated therewith, thereby to reconstitute said sequence of pulse groups.

12. Apparatus as set forth in claim 11 and in combination therewith, synchronizing means for actuating said reinverting means in time coincidence with the arrival of said individual pulse groups at said receiving station.

13. Apparatus as set forth in claim 11 wherein said receiving station comprises means connected in tandem with said selective inverting means for eliminating said designating pulse signals from said reconstituted sequence whereby said signal train of binary pulses is reformed.

14. In a system for communicating from a source of a signal train of On and Off pulses to a receiving station through a transmission channel having a frequency response characterized by a rejection of low frequency signals, whereby a wandering reference potential level is imposed upon trains of pulses having low frequency components when transmitted through said transmission channel, the combination which comprises means for periodically inserting a designating pulse signal of fixed polarity into said train of pulses, thereby to form a new sequence of coded pulse groups each extending throughout a fixed interval, signal responsive means connected in tandem with said inserting means for selectively inverting the polarity of individual ones of said pulse groups, means for deriving a control signal indicative of the comparison of the potential level of each of said individual pulse groups with the potential level of signal components rejected by said transmission channel prior to the occurrence of said group, means for applying said control signal in operating relation to said signal responsive inverting means, thereby to form a new train of coded pulse groups having substantially no low frequency components, said tandem connected inserting means and inverting means being interposed between said source and said transmission channel whereby said new train is propagated through said channel toward said receiving station, and means for selectively reinverting pulse groups of said new pulse train, thereby to reform said pulse sequence and means for eliminating said designating pulse from said pulse sequence, thereby to reconstitute said signal train of On and Off pulses, said reinverting means and said eliminating means being tandem connected with said transmission channel at said receiving station.

15. In a system for communication between a source of a train of On and Off pulses and a receiving station through a transmission channel interconnecting said source and said station, said channel having a signal frequency response characterized in rejecting low frequency signal components, whereby a wandering reference potential level is imposed upon pulse signals having low frequency components when transmitted through said channel, the combination comprising a message encoder interposed between said source and said channel, said encoder comprising means connected to said source for periodically inserting a designating pulse signal of a fixed polarity into said train of On and Off pulses, thereby to form a new train of coded pulse groups each extending throughout a fixed interval, delay means connected in tandem with said inserting means for delaying signals applied thereto for a time equal to said fixed interval, a signal-operated translating element, having an input point, an output point and a control point, for translating signals applied to said input point with a polarity dependent upon a signal applied to said control point, said element being interconnected between said delay means and said transmission channel, comparing means responsive to dual input signals applied thereto for applying a control signal to said control point, integrating means interconnected between said inserting means and said comparing means for applying a first input signal to said comparing means in proportion to the potential level of each of successive groups of said pulse train, and low pass filter means interconnected between said output point and said comparing means for applying to said comparing means an input signal proportional to channel rejected components of signals occurring prior to each of said successive groups, whereby said groups are successively translated through said inverting element with a selected polarity, thereby to form a second train of coded pulse groups having substantially no low frequency components.

16. In a system for communication between a source of a signal train of coded On and Off pulse groups and a receiver station through a transmission channel comprising a plurality of tandem connected segments each having a signal frequency response characterized by a rejection of low frequency signal components, whereby a wandering reference potential level is imposed upon pulse signals having low frequency components when applied to said transmission channel segments, the combination which comprises a like plurality less one of signal repeaters respectively interposed between successive pairs of said tandem connected segments, whereby a signal train of On and Off pulses applied to the first one of said channel segments is propagated along said channel being successively regenerated by said repeaters, signal responsive means interposed between said source and said first transmission channel segment for selectively inverting the polarity of individual groups of said signal train, means for deriving a control signal indicative of the comparison of the potential level of each successive pulse group with the potential level of signal components rejected by said first channel segment prior to the occurrence of said group, and means for applying said control signal in operating relation to said signal responsive inverting means, whereby a new train of coded On and Off pulse groups having substantially no low frequency components is applied to said first transmission channel segment for propagation through alternate ones of said segments and of said repeaters.

17. In a system for communicating between a generator of a train of On and Off pulses and a receiving station interconnected therewith through a transmission channel, said receiving station comprising signal responsive means for drawing output currents from a source, signal controlled means interconnected between said generator and said channel for selectively inverting the polarity of groups of said pulses, adding means for deriving a first signal proportional to the amplitude of signals applied to said channel, adding means for deriving a second signal proportional to the combined amplitudes of pulse signals in a group of said pulses, comparing means for deriving a control signal from said first and second proportional signals, and means for applying said control signal to said selective inverting means, whereby said train of pulses is applied to said transmission channel as a new train of On and Off pulses having a substantially fixed proportion relating occurrences of said On pulses with occurrences of said Off pulses.

References Cited in the file of this patent

UNITED STATES PATENTS

| | | |
|---|---|---|
| 2,516,587 | Peterson | July 25, 1950 |
| 2,547,598 | Roschke | Apr. 3, 1951 |
| 2,716,732 | Garner et al. | Aug. 30, 1955 |
| 2,769,861 | Black | Nov. 5, 1956 |
| 2,852,608 | Sziklai et al. | Sept. 16, 1958 |